C. N. CADY.
SHAFT HANGER GEARING.
APPLICATION FILED AUG. 12, 1919.

1,344,439.

Patented June 22, 1920.

INVENTOR
C. N. Cady.
BY Denison Thompson
ATTORNEYS

UNITED STATES PATENT OFFICE.

CHARLES N. CADY, OF CANASTOTA, NEW YORK.

SHAFT-HANGER GEARING.

1,344,439.  Specification of Letters Patent.  Patented June 22, 1920.

Application filed August 12, 1919. Serial No. 316,969.

*To all whom it may concern:*

Be it known that I, CHARLES N. CADY, of Canastota, in the county of Madison, in the State of New York, have invented new and useful Improvements in Shaft - Hanger Gearing, of which the following, taken in connection with the accompanying drawings, is a full, clear, and exact description.

This invention relates to certain new and useful shaft hanger gearing.

It has been customary to drive milking machine shafts by means of exposed gearing embodying a small gear upon the shaft and a very large gear meshing therewith and driven from any suitable source of power resulting in a more or less complicated arrangement necessitating the obstruction of considerable space and requiring the services of a more or less skilled mechanic for installing the machine.

An object, therefore, of this invention is to provide a unitary, self-supported, self-contained and noiseless shaft hanger gearing, incapable of being improperly applied to the shaft thereby eliminating the necessity of skilled mechanics in installing the apparatus and occupying considerably less space than the present gearing for the same purpose. It will be understood that although the device is peculiarly designed for use in connection with milking machines that nevertheless it is capable of quite general application and I do not, therefore, limit myself to its use with any particular character of machine.

Other objects relate to the details of construction, form and arrangement of the parts as will more fully appear from the following description taken in connection with the accompanying drawing in which:—

Figure 1:
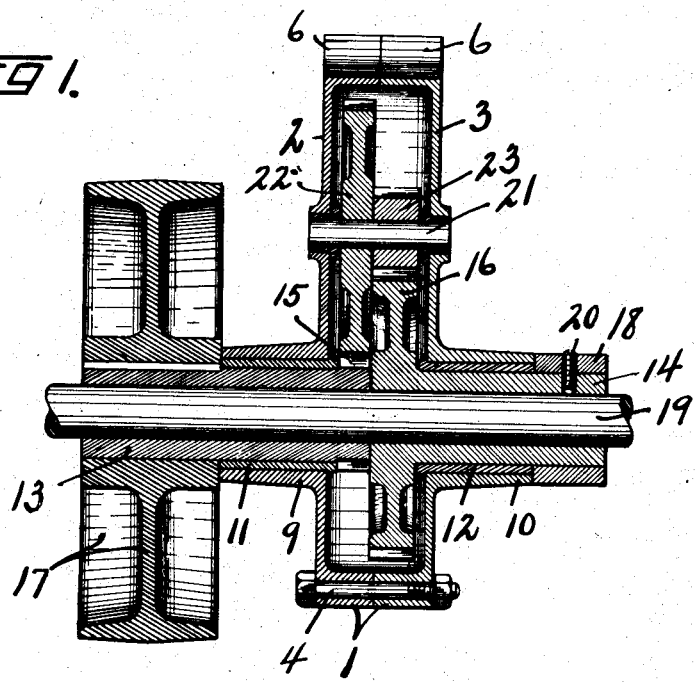
Figure 1 is a sectional view of the device.
Figure 2:
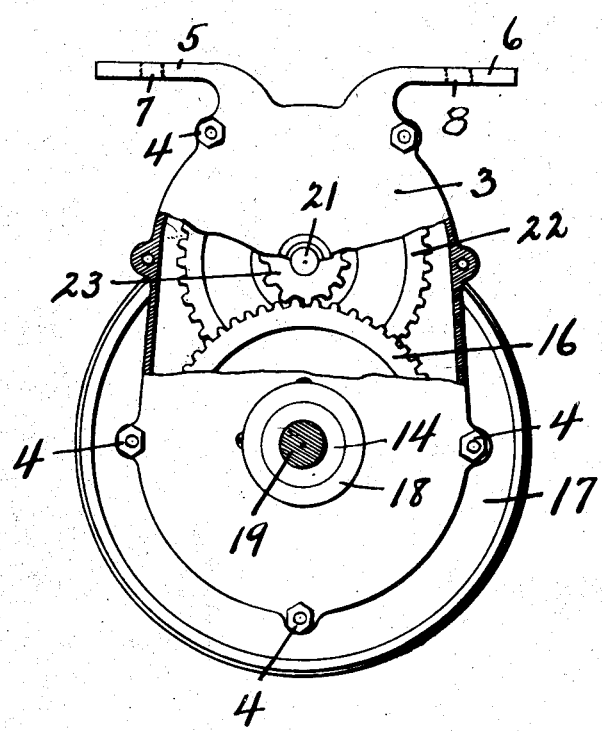
Fig. 2 is a view partially in section of the same device taken at right angles to Fig. 1.

The device as shown comprises a casing —1— formed of two similar pan shaped sections —2— and —3— having their open ends abutting and removably secured together in any suitable way as by bolts —4—. The upper end of one of the sections, or as shown, of both sections is formed with opposite extending feet —5— and —6—, respectively, and having openings —7— and —8— for the passage of bolts, screws, or the like for securing the casing to the ceiling or wall of any suitable structure thereby constituting the casing self-supporting and capable of carrying a shaft and its operating gearing.

The casing is provided with oppositely projecting substantially cylindrical bosses —9— and —10— within which suitable Babbitt or other bearings —11— and —12— are mounted for receiving oppositely extending sleeves —13— and —14— having their inner ends disposed within the casing —1— and substantially abutting and carrying gear elements —15— and —16—, as shown the gear —15— being of relatively small diameter and the gear —16— of relatively large diameter.

The sleeve —13— projects beyond its respective boss —9— and a pulley —17— is keyed or otherwise secured to this projecting part of the sleeve. In like manner the sleeve —14— projects beyond its respective inclosing boss —10— and carries a collar —18— secured to the sleeve —14— and shaft —19— for simultaneous rotation therewith by means of set screw —20—.

The shaft —19— is a driving shaft for any desired apparatus and extends through and is mounted in the sleeves —13— and —14—, being free to rotate within and relatively to the sleeve —13— when driven by the sleeve —14— and its actuating parts. Or reversely the sleeve —13— when driven by pulley —17— is free to rotate upon the shaft —19— and for the purpose of transferring rotary movement of said sleeve —13— to the sleeve —14— at a different and preferably reduced speed, the casing —1— is provided with a counter shaft —21— journaled in opposite walls of the casing and carrying a pair of gears, the one a relatively large gear —22— meshing with the gear —15— and the other a relatively small gear —23— meshing with the gear —16— whereby rotary movement of sleeve —13— is positively transferred to sleeve —14— but at a considerably lower speed, the rotation of sleeve —14— causing similar and simultaneous rotation of shaft —19—.

The casing —1— constitutes a hanger for the shaft and a support for all of the actuating parts of the reduction gearing and is preferably packed with a suitable lubricant effecting a substantially noiseless operation of the parts.

The entire device as a unitary structure may be readily fitted over any suitable shaft, the feet —5— secured to any suitable support, the set screw —20— properly moved to grip the shaft and the device is in condition for operation.

Although I have shown and described a specific construction and combination of elements together with particular form and arrangement of the same as constituting a perhaps preferred embodiment of my invention, I do not desire to limit myself to the details of form, construction, or arrangement, except where specifically set forth in the claims, as various changes and modifications may be made without departing from the spirit of this invention as set forth in the appended claims.

What I claim is:—

1. The combination with a casing having oppositely extending bosses, of a sleeve mounted in each boss, each sleeve having its end projecting within the casing and carrying a gear element, additional gearing for correlating said sleeve gears so that movement of one actuates the other at a different speed, a shaft extending through said sleeves and means for securing one of the sleeves to the shaft to effect simultaneous rotation of the parts.

2. The combination with a casing having oppositely extending bosses, of a sleeve mounted in each boss, each sleeve having its end projecting within the casing and carrying a gear element, additional gearing for correlating said sleeve gears so that movement of one actuates the other at a different speed, a shaft extending through said sleeves and means for securing one of the sleeves to the shaft to effect simultaneous rotation of the parts, and a pulley mounted upon the other sleeve and secured thereto for effecting simultaneous rotation thereof.

3. In a shaft hanger gearing, a casing having hanger feet, tubular bosses extending from opposite sides of the casing, a sleeve mounted in each boss and projecting within the casing, a gear carried by each sleeve, a counter shaft mounted in said casing, a pair of gears mounted on said counter shaft for operative engagement with the gears upon said sleeves, a shaft extending through the said sleeves and means for securing one of the sleeves to the shaft for simultaneous rotation.

4. In a shaft hanger gearing, a casing having hanger feet, tubular bosses extending from opposite sides of the casing, a sleeve mounted in each boss and projecting within the casing, a gear carried by each sleeve, a counter shaft mounted in said casing, a pair of gears mounted on said counter shaft for operative engagement with the gears upon said sleeves, a shaft extending through the said sleeves and means for securing one of the sleeves to the shaft for simultaneous rotation, each of said sleeves projecting beyond its respective tubular boss, a collar mounted upon a portion of one of said sleeves projecting beyond its respective boss, means for securing the collar to the sleeve, and a pulley mounted upon and secured to a portion of the other sleeve projecting beyond its respective boss.

In witness whereof I have hereunto set my hand this 7th day of August, 1919.

CHARLES N. CADY.

Witnesses:
H. E. CHASE,
E. A. THOMPSON.